(12) United States Patent
Miwa et al.

(10) Patent No.: US 6,659,951 B2
(45) Date of Patent: Dec. 9, 2003

(54) ULTRASONIC DIAGNOSIS DEVICE (75) Inventors: Yuichi Miwa, Chofu (JP); Ryuichi Shinomura, Higashimatsuyama (JP); Shinichiro Umemura, Hachioji (JP)

(73) Assignee: Hitachi Medical Corporation, Tokyo (JP)

( * ) Notice: Subject to any disclaimer, the term of this patent is extended or adjusted under 35 U.S.C. 154(b) by 0 days.

(21) Appl. No.: 10/090,821

(22) Filed: Mar. 6, 2002

(65) Prior Publication Data

US 2002/0123686 A1 Sep. 5, 2002

Related U.S. Application Data (62) Division of application No. 09/555,044, filed as application No. PCT/JP98/05340 on Nov. 27, 1998.

(30) Foreign Application Priority Data

Nov. 28, 1997 (JP) .............................................. 9-328379

(51) Int. Cl.[7] ................................................ A61B 8/00
(52) U.S. Cl. ...................................................... 600/443
(58) Field of Search ................................ 600/437, 443, 600/438, 447, 454–456; 73/625–626

(56) References Cited

U.S. PATENT DOCUMENTS

| 4,140,022 A | 2/1979 | Maslak |
| 4,983,970 A | 1/1991 | O'Donnell et al. |
| 5,831,168 A | 11/1998 | Shinomura et al. |
| 5,891,041 A | 4/1999 | Shinomura et al. |
| 6,029,116 A | 2/2000 | Wright et al. |
| 6,200,266 B1 | 3/2001 | Shokrollahi et al. |
| 6,383,140 B1 * | 5/2002 | Miwa et al. ................. 600/443 |

FOREIGN PATENT DOCUMENTS

| JP | 52-20857 | 2/1977 |
| JP | 6-313764 | 11/1994 |
| JP | 7-303638 | 11/1995 |
| JP | 9-19429 | 1/1997 |
| JP | 9-206298 | 8/1997 |

* cited by examiner

Primary Examiner—Francis J. Jaworski
(74) Attorney, Agent, or Firm—Mattingly, Stanger & Malur, P.C.

(57) ABSTRACT

This invention provides a technology that freely changes the frequency of a reference signal in a digital ultrasonic diagnosis device and makes it possible to conduct various high-quality or high-speed imaging. Reception signals obtained by an ultrasonic element group disposed in an array are digitized in a sampling cycle higher than a Nyquist frequency of the reception signals, and are mixed with reference signal. The mixed signals are then accumulated in a sampling direction, a number of the mixed signals accumulated being equal to a number of a plurality of samples, and are delayed and added by wave reception focusing means. The reference signal serially read out and used from memory means in such a manner as to correspond to the sampling number of the reception signals. A reference signal train acquired from signals, the frequency of which decreases gradually with a lapse of time, from wave transmission, or a reference signal train obtained alternately from two signals having different frequencies, may be stored in advance in memory means.

4 Claims, 4 Drawing Sheets

ULTRASONIC DIAGNOSIS DEVICE

This is a divisional application of U.S. Ser. No. 09/555,044, filed May 24, 2000, which is a 371 of PCT/JP98/05340, filed Nov. 27, 1998.

TECHNICAL FIELD

This invention relates to an ultrasonic diagnosis device. More particularly, this invention relates to a technology that will be useful for digitization of a signal processing that acquires tomograms having high image quality irrespective of an object and an imaging portion, in an apparatus for non-destructively inspecting an object by ultrasonic waves or in an ultrasonic diagnosis device for conducting medical diagnosis.

BACKGROUND ART

A method called a "frequency shift beamforming method" is known as one of the signal processing methods for forming ultrasonic tomograms by using reception signals from ultrasonic transducer elements that are disposed in an array. This method comprises the steps of mixing the signal from each ultrasonic element with a reference signal, extracting a low frequency component of each mixed signal, or in other words, moving it towards the low frequency side, delaying the mixed signals by respective delay circuits to beamforming, then adding the signals, and obtaining ultrasonic response signals focused to desired positions. References associated with the present invention include U.S. Pat. No. 4,140,022, JP-A-52-20857 and U.S. Pat. No. 4,983,970.

JP-A-6-313764 discloses the technology that is based on the frequency shift beamforming method described above and the major proportion of the signal processing circuit is a digital circuit. This technology employs particularly an over-sampling technique that executes an accumulation processing after each sampled ultrasonic signal is mixed with a reference signal, and improves effective accuracy of analog-to-digital conversion.

On the other hand, JP-A-9-206298 discloses an ultrasonic diagnosis device employing digital orthogonal wave detection. In this reference, a signal from each ultrasonic transducer element is delayed by a delay circuit. Next, the delayed signal is inputted to an orthogonal detection circuit, and the in-phase component and the orthogonal component are generated. This orthogonal detection circuit executes interpolation that is equivalent to changing the frequency of the reference wave to cope with a spectrum shift in which the center frequency of an ultrasonic echo shifts to a low frequency range with the echo time.

DISCLOSURE OF INVENTION

It is not easy to drastically change the frequency of the reference wave in a system which executes the effective change of the reference wave by interpolation. In the digital orthogonal detection system of the known reference described above, the high frequency signal generated by digitizing the ultrasonic signal from each element is beamformed by the delaying means before the frequency shifts to the low frequency range. Therefore, high accuracy is necessary for controlling the delay time of each signal channel.

The present invention is based on the premise of the frequency shift beamforming method that exploits the effect of over-sampling. In other words, an ultrasonic signal from each element is sampled at a frequency higher than a Nyquist frequency of the upper limit of its signal band, and is subjected to an accumulation processing in a subsequent stage. The digital signal so sampled is then mixed with a reference signal and is beamformed by a delaying circuit after the accumulation processing is done and then added.

In such a digitized ultrasonic diagnosis device in accordance with the frequency shift beamforming method, it is one of the objects of the present invention to freely vary the frequency of the reference signal and to make it possible to conduct various high-quality or high-speed imaging.

In an ultrasonic diagnosis device comprising primarily digital circuits, it is one of the more concrete objects of the present invention to provide a technology capable of conducting harmonic imaging.

In an ultrasonic diagnosis device comprising primarily digital circuits, it is another object of the present invention to provide a technology capable of simultaneously forming a plurality of beams having different frequencies.

It is a further object of the present invention to improve resolution in a lateral direction and to thus improve quality of ultrasonic images.

The above and other objects and novel features of the present invention will become more apparent from the description of the specification in connection with the accompanying drawings.

A typical construction of an ultrasonic diagnosis device according to the present invention comprises wave transmitting means for repeatedly driving an ultrasonic element group disposed in an array and generating ultrasonic waves; digital converting means for sampling reception signals obtained by the ultrasonic elements at a sampling frequency higher than a Nyquist frequency of the upper limit of the signal band and converting them to digital signals, respectively; mixing means for multiplying the digital signals by a reference signal, respectively; accumulating means for accumulating the multiplied digital signals for plurality of samples, respectively; receive focusing means for imparting a delay to each digital signal so accumulated for aligning the phase difference peculiar to each ultrasonic element and adding the digital signals; and mixing data generating means for supplying serially the reference signal to the mixing means. More concretely, the mixing data generating means includes data computing means for computing in advance a train of reference signals corresponding to the sample point number of the reception signals, and memory means for storing the reference signal line so computed and outputting serially the stored reference signals under read address control corresponding to the sample number of the reception signals.

In general ultrasonic tomograms imaging, the mixing data generating means supplies the signal, the frequency of which decreases gradually from near the center frequency of the transmission wave with the lapse of time, as the reference signal train is provided to the mixing means. In consequence, a mixing processing can be conducted in such a manner as to correspond to a spectrum shift in which the frequency band of the reception ultrasonic waves shifts to the low frequency side as an echo depth increases, and quality of the ultrasonic image can be improved.

Data acquired by digitizing signals having a frequency that is some multiples of the center frequency of the transmission ultrasonic waves are prepared as a reference signal train and are used serially for mixing. In this way, harmonic imaging can be executed easily. In this case, too, image quality can be improved by applying means for gradually decreasing the frequency.

A peculiar construction utilizing the characteristic in which the signal from each ultrasonic element is over-sampled can be employed. Namely, wave transmitting means are provided two times to the construction described above, and two beams having mutually different center frequencies ω1 and ω2 and different focus directions are synthesized and transmitted simultaneously. On the other hand, the mixing data generating means generates alternately a reference signal generated from a signal having a center frequency near ω1 and a reference signal from a signal near ω2, and multiplication is effected by using the reference signals that change alternately. The accumulating means and the receive focusing means are disposed two times, too, so that the outputs of the mixing means can be assorted and supplied by the multiplexer. One of the two receive focusing means conducts beamforming in the direction of the beam of ω1 and the other, in the direction of the beam of ω2. According to this construction, a plurality of ultrasonic beams are synthesized in wave transmission and are transmitted. In the reception signal processing, on the other hand, the beams for applying an appropriate beamforming processing are substantially selected by alternate switching of the reference signals. In this way, high-speed imaging becomes possible.

It is possible to constitute another construction by utilizing the wave transmitting means for synthesizing and transmitting a plurality of ultrasonic beams. The wave transmitting means synthesizes an ultrasonic beam having a center frequency ω1 and a first focus in a near distance and an ultrasonic beam having a center frequency ω2 which is lower than ω1 and a second focus in the same direction as the first focus but in a far distance, and transmits the synthesized signal. The portion of the reception signal processing is exactly the same as ordinary imaging described above. Mixing is executed by the reference signal train acquired from the signal the frequency of which decreases gradually. According to this construction, multi transmit focusing is made by simultaneous wave transmission. Consequently, imaging can be made at a high speed while resolution in the lateral direction is improved in a broad depth range.

BEST MODE FOR CARRYING OUT THE INVENTION

Hereinafter, embodiments of the present invention will be explained in detail with reference to the drawings. The same reference numeral will be assigned to a member having the same function throughout the drawings.

(Embodiment 1)

Figure 1:
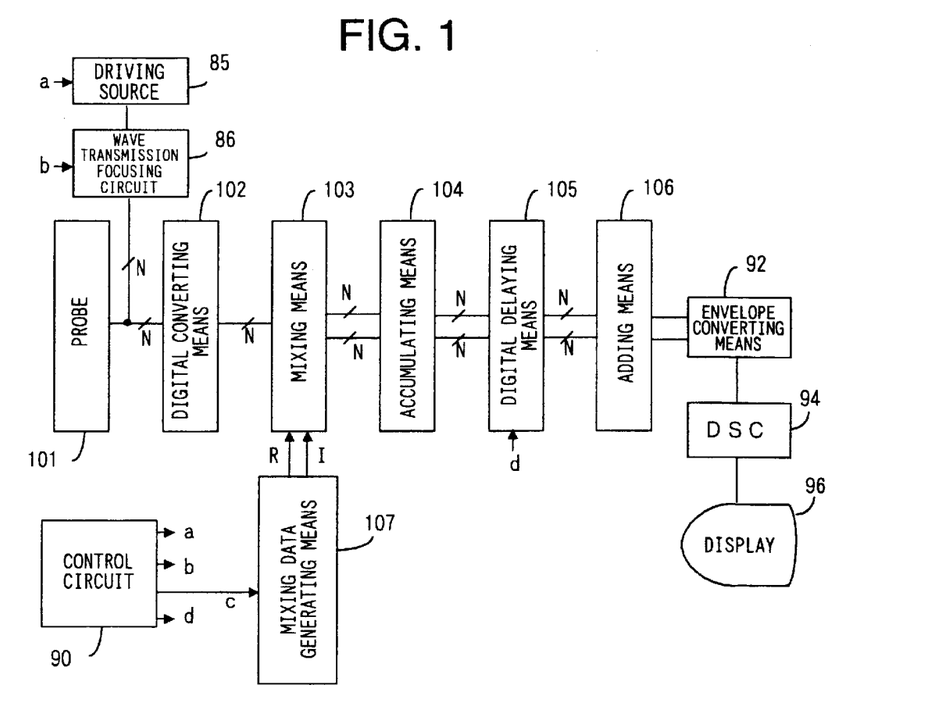
FIG. 1 is an explanatory block diagram showing a schematic construction of an ultrasonic diagnosis device according to Embodiment 1 of the present invention.

FIG. 1 is a diagram for explaining a schematic construction of an ultrasonic diagnosis device according to Embodiment 1 of the present invention. An ultrasonic probe 101 includes N ultrasonic elements that are arrayed one dimensionally. Each ultrasonic element is repeatedly driven by a wave transmission signal obtained by imparting a delay distribution to a driving signal generated by a driving source 85 by a wave transmission focusing circuit. Digital conversion means 102 comprises N A/D converters. A reception signal of an ultrasonic echo of each element is sampled by a sampling clock of a cycle T that is common to all channels, and is digitized. The sampling cycle T is set to a value smaller than a Nyquist cycle of the upper limit of the band of a reception wave signal. Here, the term "channel" represents one signal component in the process in which N reception signals are subjected to the same processing in parallel with one another. Each of the digitized signals is multiplied by a digitized reference signal in mixing means 103. The reference signal to be multiplied will be explained later in detail. However, since it is a discrete value of complex components R and I of a signal having a frequency ωm substantially equal to a center frequency ωS of the reception signal, the multiplication results prove complex signals. Furthermore, its frequency band shifts to the band having its center at a subtracted frequency band (base band) between the band of the original reception signal and ωS, and at a summed frequency (ωS+ωm). Each multiplication result is accumulated by accumulating means 104, for a plurality of samples, that is, a number of multiplication results accumulated being equal to a number of a plurality of samples, in the direction of the lapse of time. The result is only the base band portion due to a low-pass filter effect brought forth by accumulation. Incidentally, the accumulating means 104 may be not only means for executing mere accumulation but also means for executing accumulation with multiplication by a weighting function, that is, multiplication and addition computation, to realize desired low-pass filter characteristics.

Digital delaying means 105 applies a delay that compensates the difference of an echo arrival time of each element, to each accumulation signal. The delay results for the N channels are added by adding means 106 to accomplish a well-known electronic focusing effect that amplifies only a reflection echo from a target focal point. The output of the adding means 106 can be obtained for each of the real part (in-phase component) and the imaginary part (orthogonal portion) of the complex signals. Therefore, envelop changing means 92 changes the values to absolute values and writes the results into a digital scan converter 94.

The operation described above is repeatedly executed in accordance with an electronic sector scan method that is well known in the art. The direction of the focal point of the transmission ultrasonic wave accomplished by a wave transmission focusing circuit 86 is changed whenever the wave transmission is repeated. The direction of the focal point of the reception wave beam, that is accomplished by the digital delaying means 105, too, is controlled in match with that of the transmitting ultrasonic wave. The result of this beam scan is memorized serially in the digital scan converter 94, and an ultrasonic tomogram is displayed by a display 96.

Incidentally, the focal point of the reception beam is moved in a depth-wise direction as the echo depth of the reception signal becomes deeper with the lapse of time during the wave reception period subsequent to one wave transmission operation. This technique, too, is well known in the art as dynamic receive focusing. The control signal d given from a control circuit 90 to the digital delaying means 105 in FIG. 1 represents the signal for controlling the change of the delay distribution resulting from the focus movement. On the other hand, the control signal b to be given to the wave transmission focusing circuit 86 represents the signal for controlling the change of the direction of the focal point of the transmission ultrasonic wave described above.

In the ultrasonic diagnosis device described above, the digitized reference signal multiplied by the mixing means 103 for moving the frequency band is not the one that is obtained by digitizing a signal having a predetermined frequency. In other words, the high frequency component of the reception signal attenuates vigorously with the lapse of time following the transmission of the wave, or in other words, as the depth of the reflecting sound source becomes greater, the center frequency ωS of the reception signal shifts to a lower frequency direction. Therefore, if the reference signal of a predetermined frequency is used, detection efficiency of the ultrasonic echoes degrades in the deep region. The reference signal supplied from mixing data generating means 107 to the mixing means 103, too, changes the frequency in such a manner as to correspond to such a spectrum shift.

Figure 2:
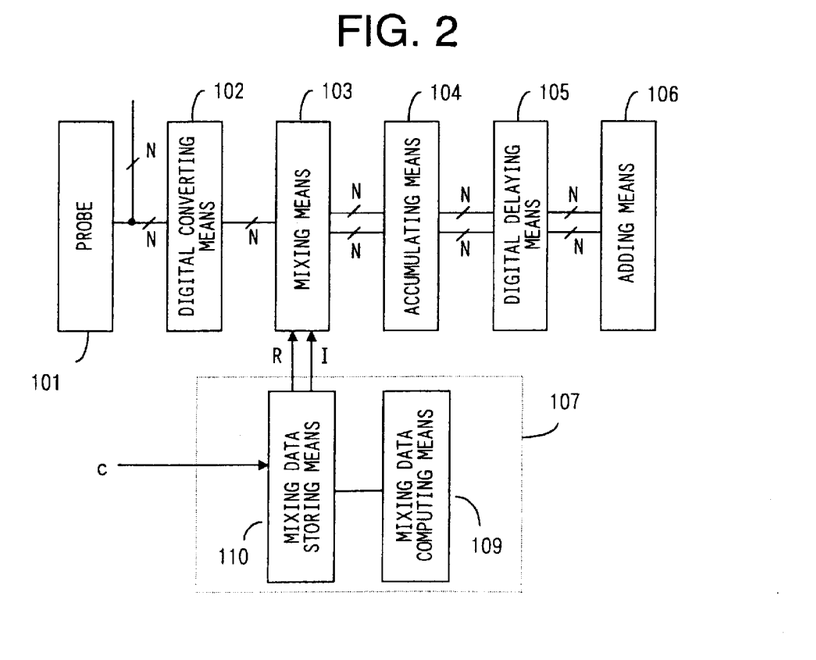
FIG. 2 is a block diagram showing a detailed construction of Embodiment 1 described above.

The mixing data generating means 107 comprises mixing data computing means 109 and mixing data storing means 110 as shown in FIG. 2. The mixing data computing means 109 is materialized by a program running on a known data processing unit. In this embodiment, the sampling cycle T of the digital converting means is 40 nsec and the number of samples in the wave reception period after one wave transmitting operation is 4,096. Consequently, the mixing data computing means 109 computes the complex components of the reference signal expressed by the following equation for an integer k satisfying the relation 0<k<4,096:

$$h(kT) = \exp(j\omega m(kT)kT) \tag{1}$$

Figure 3:
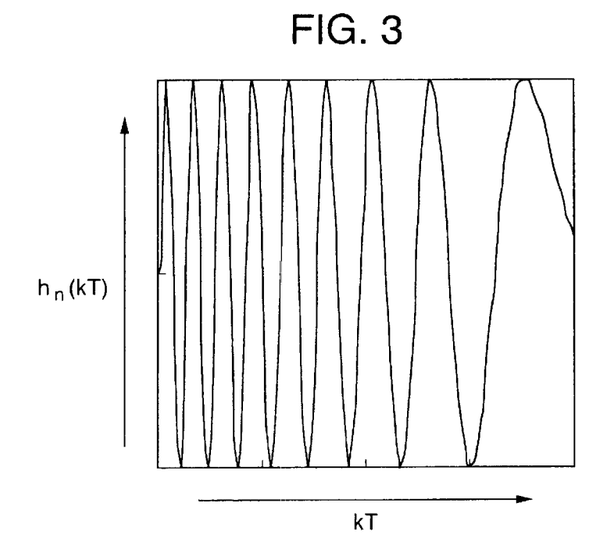
FIG. 3 is a waveform diagram of a signal the frequency of which drops with the lapse of time as the basis of mixing data in Embodiment 1 described above.

Incidentally, the phase item should be expressed correctly by integration, but is expressed in brief by the product of the frequency and the time in equation (1). FIG. 3 shows the function expressed by equation (1). The frequency ωm(kT) drops monotonously with the lapse of time from near the center frequency of the transmission wave, that is, with an increasing k value. The degree of this drop may follow the shift of the center frequency of the reception signal of the ultrasonic wave. When the center frequency of the transmission signal is 3.5 MHz, for example, the following equation can be employed as ωm(kT) in equation (1):

$$\omega_m(kT) = 2\pi \cdot 3500000 \cdot \left(1 - \frac{k}{4095} \cdot \frac{2}{7}\right) \tag{2}$$

In equation (2), ωm(kT) is 3.5 MHz when k=0. Thereafter the frequency decreases linearly and reaches ωm(kT)=2.5 MHz at k=4095.

The mixing data computing means 109 computes in advance the complex components of the discrete value of the signal, the frequency of which is variable, in every 40 nsec for all k values of 0<k<4,096 as a digitized reference signal train, and the mixing data storing means 110 stores the computation results. The mixing data storing means 110 includes a known semiconductor memory. The address control signal represented by c in FIG. 1 serially designates the read address of the mixing data storing means 110. The digitized reference signals supplied are serially read out in such a manner as to correspond to the sample number k of the digitized reception signals and are supplied to the mixing means. Incidentally, this digitized reference signal is common to each channel. Generally, the spectrum shift of the reception signal frequency is not much affected by the direction of the ultrasonic beam. Therefore, the same changing method not depending on the beam direction may be employed for the frequency change of the reference signal. In other words, the data read control by sequential designation of the address is repeated in exactly the same way whenever the transmission wave iterates.

When the reference signal of the frequency following the spectrum shift of the reception signal is employed for mixing as described above, the center frequency of the base band component generated by mixing always exists near zero. Consequently, base band extraction by accumulation can be executed highly efficiently, hence, quality of the ultrasonic tomogram can be improved.

In the embodiment given above, the frequency of the reference signal corresponding to the reception signal from the smallest depth (k=0) is set to be equal to the center frequency 3.5 MHz of the transmission wave. It may be possible, however, to set the center frequency of the reception wave to be imaged to a higher value, that is, to set the frequency of the reference signal corresponding to k=0 to a higher value. For instance, ωm(kT) is given by the following equation (3):

$$\omega_m(kT) = 2\pi \cdot 4500000 \cdot \left(1 - \frac{k}{4095} \cdot \frac{4}{9}\right) \tag{3}$$

In this equation (3), ωm(kT)=4.5 MHz at k=0, and ωm(kT)=2.5 MHz at k=4,095. The following equation (4) or (5) may be employed, too, as an example for decreasing ωm(kT) in the secondary function of k:

$$\omega_m(kT) = 2\pi \cdot 3500000 \cdot \left(1 - \left(\frac{k}{4095}\right)^2 \cdot \frac{2}{7}\right) \tag{4}$$

$$\omega_m(kT) = 2\pi \cdot 4500000 \cdot \left(1 - \left(\frac{k}{4095}\right)^2 \cdot \frac{4}{9}\right) \tag{5}$$

Next, measures for coping with harmonic imaging in the ultrasonic diagnosis device of Embodiment I will be described.

Let's consider the signal obtained by discretizing the reception signal of the nth element of the array when the center frequency of the transmission wave is ωs and its envelop shape is A(t). Then, the component having the largest amplitude can be expressed by the following equation (6):

$$fn(kT) = u(kT - \tau n) \tag{6}$$

$$= A(kT - \tau n)[\exp\{j(\omega s(kT)kT - \phi n)\} + \exp\{-j(\omega s(kT)kT - \phi n)\}]$$

where τn is the propagation time of the sound wave to the nth element, and φn=ωs(t)·τn. The value ωS(kT) represents that the frequency giving the greatest reception amplitude changes gradually depending on the spectrum shift described above. On the other hand, the reception signal contains also the harmonics, and when the double harmonics are taken into particular consideration, the discretized reception signal can be expressed by the following equation (7):

$$fn(kT) = u(kT - \tau n) \quad (7)$$
$$= A(kT - \tau n)[\exp\{j(2\omega s(kT)kT - 2\phi n)\} +$$
$$\exp\{-j(2\omega s(kT)kT - 2\phi n)\}]$$

This harmonic imaging based on the double harmonics can be executed by applying a reference signal the frequency of which satisfies the relation $\omega m(kT) \approx 2\omega s(kT)$ as the reference signal to be supplied to the mixing means 103. In other words, the discretized digital reference signal hn(kT) satisfies the following equation (8):

$$hn(kT) = \exp(j2\omega s(kt)kT) \quad (8)$$

Then, the multiplication results by the mixing means 103 for the above-mentioned equations (7) and (6) are given by the following equations (9) and (10), respectively:

$$gn(kT) = fn(kT) \cdot hn(kT) \quad (9)$$
$$= A(kT - \tau n)[\exp\{j(4\omega s(kT)kT - 2\phi n)\} +$$
$$\exp(j2\phi n)]$$

$$gn(kT) = fn(kT) \cdot hn(kT) \quad (10)$$
$$= A(kT - \tau n)[\exp\{j(3\omega s(kT)kT - \phi n)\} +$$
$$\exp\{j(\omega s(kT)kT + \phi n)\}]$$

In other words, when the reference signal having the frequency $\omega m(kT) \approx 2\omega s(kT)$ is multiplied, the double harmonic component of the reception signal shifts to the band having the center at $4\omega s$ (kT) and the base band of the low frequency. Therefore, the device construction shown in FIG. 1 can extract only this base band and can execute imaging by the filter effect due to accumulation. At this time, the basic wave component of the reception signal shifts to the frequencies $3\omega s(kT)$ and $\omega s(kT)$ as expressed by equation (10) and attenuates due to the filter effect of accumulation. In other words, in the device construction explained with reference to FIGS. 1 and 2, harmonic imaging can be executed by only rendering the digitized reference signal that is stored in the mixing data storing means 110 and is to be read out serially subject to equation (8).

This harmonic imaging, too, is affected by the high band attenuation of the reception signal with the lapse of time after wave transmission described already. Therefore, image quality can be improved by using in combination the control method that lowers the frequency of the reference signal with the lapse of time. When the attenuation effect by the accumulating means 104 is not sufficient, an analog filter may be interposed in the prior stage of the digital converting means 102 so that the basic wave component near the frequency $\omega s$ of the reception signal can be damped in advance.

(Embodiment 2)

As described above, the band of the reception signal can be selected and imaged by selecting the frequency of the digitized reference signal to be multiplied to the ultrasonic reception signal. Based on this principle, therefore, Embodiment 2 of the present invention shown in FIG. 4 transmits a plurality of ultrasonic beams having mutually different frequencies, distributes the outputs of the mixing means with change-over of the reference signal and acquires in parallel the images of a plurality of beams having different frequencies.

Figure 4:
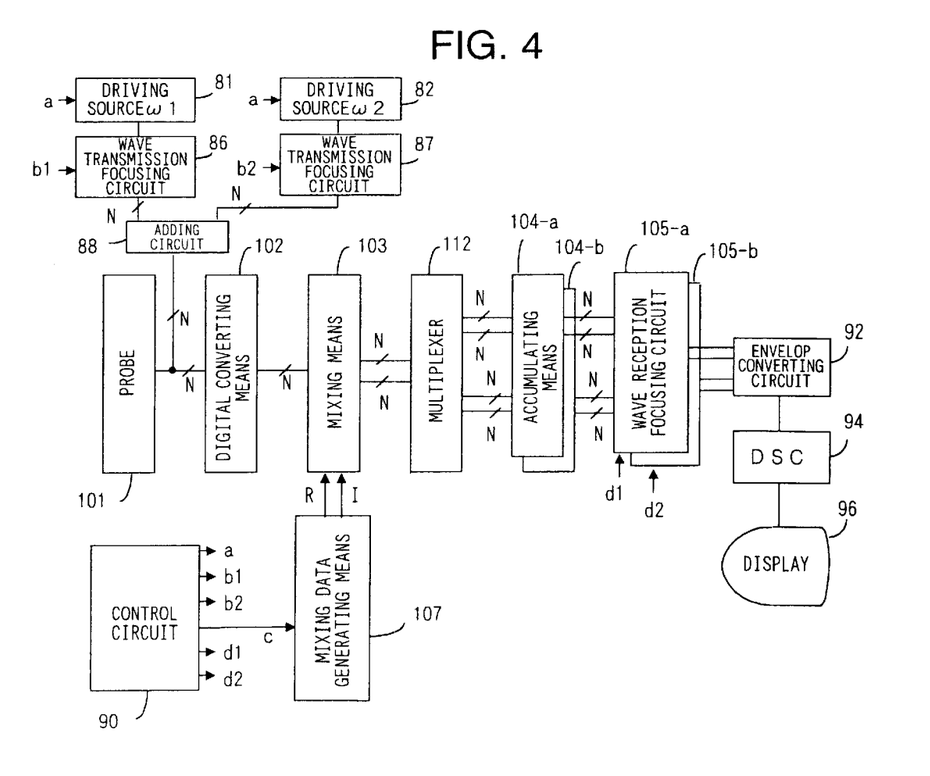
FIG. 4 is an explanatory block diagram showing a schematic construction of an ultrasonic diagnosis device according to Embodiment 2 of the present invention.
Figure 5:
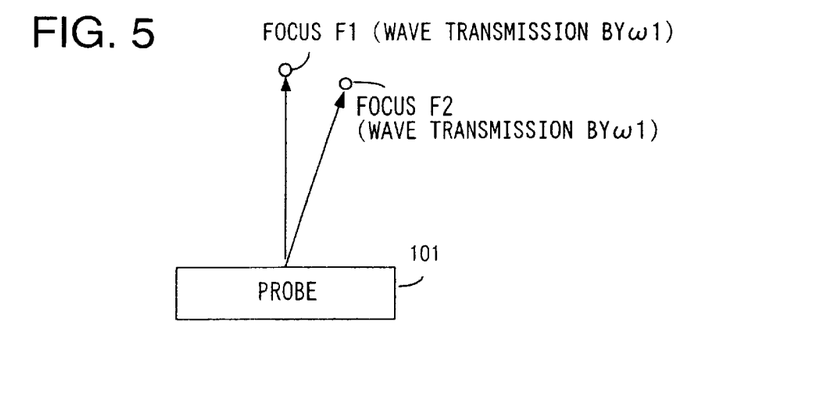
FIG. 5 is a conceptual view showing simultaneous transmission of waves in two directions in Embodiment 2 described above.

Referring to FIG. 4, a driving source 81 generates a transmission wave signal having a center frequency $\omega 1$ and a driving source 82 generates a transmission wave signal having a center frequency $\omega 2$. These transmission wave signals are inputted to separate wave transmission focusing circuits 86 and 87, respectively, to obtain N transmission wave signals to which a delay distribution is given. Adding means 88 adds these signals for each channel and drives each element of a probe 101. Here, the focus position F1 realized by the wave transmission focusing circuit 86 and the focus position F2 realized by the wave transmission focusing means 87 have different directions as shown in FIG. 5. In consequence, two ultrasonic beams having mutually different center frequencies and directions are simultaneously transmitted. More concretely, $\omega 1$ is 3.5 MHz and $\omega 2$ is 5.0 MHz.

On the other hand, mixing means 103 multiplies the digitized reception signal of each element by the reference signal in exactly the same way as in the device of Embodiment 1. However, this embodiment is different from Embodiment 1 in that the reference signal used is alternately switched between the even-numbered samples and the odd-numbered samples. In other words, memory means inside mixing data generating means 107 stores the following digitized reference signals h(kT) in such a manner as to correspond to the sample number k (0<k<4096) of the reception signal:

When k is even-numbered:

$$h(kT) = \exp(j\omega m1(kT)kT) \quad (11\text{-}1)$$

When k is odd-numbered:

$$h(kT) = \exp(j\omega m2(kT)kT) \quad (11\text{-}2)$$

Figure 6:
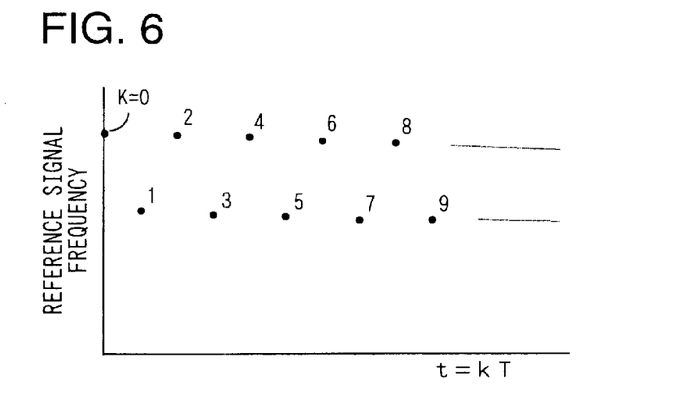
FIG. 6 is a conceptual view showing examples of digitized reference signals in Embodiment 2 described above.

Here, $\omega m1(kT)$ is substantially equal to the transmission wave center frequency $\omega 1$ of the driving source 81, and $\omega m2$ (kT) is substantially equal to the transmission wave center frequency $\omega 2$ of the driving source 82. These reference signal frequencies $\omega m1(kT)$ and $\omega m2(kT)$ may be a constant value, respectively, or may be decreased gradually with the increase of k in such a manner as to correspond to the spectrum shift of the reception signals with the lapse of time from the wave transmission. FIG. 6 shows the relation between k and $\omega m1(kT)$ and between k and $\omega m2(kT)$ when the reference signals based on the frequency of which decreases gradually are employed.

The multiplication results, that are obtained when the digitized reference signals switching alternately are supplied serially, are assorted by a multiplexer 112 shown in FIG. 4 to even-numbered results and odd-numbered results, and are added by adding means 103-a and 104-b that are disposed double. The addition results are delayed and added by receive focusing circuits 105-a and 105-b that are disposed double. The receive focusing circuit represents together the digital delaying means 105 and the adding means 106 shown in FIG. 1. The wave reception focusing circuit 105-a is controlled so that the focus of the reception wave beam is formed in the direction of the transmission wave focus F1 with respect to the odd-numbered samples as the product of the multiplication result of the reference signals having the frequency $\omega m1(kT)$. In other words, the delay distribution is imparted so as to compensate for the difference of the ultrasonic wave transmission time from the sound source in the direction F1 to each element. The wave reception focusing circuit 105-b is controlled in such a manner as to form the focus of the reception wave beam in the direction of the transmission wave focus F2 with respect to the even-numbered samples as the product of the multiplication result of the reference signals having the frequency ωm2 (kT). In other words, the delay distribution is imparted so as to compensate for the difference of the ultrasonic wave transmission time from the sound source in the direction F2 to each element. These reception wave focuses are moved from near to far in the directions F1 and F2 with the lapse of time from the transmission of the waves. In other words, it is preferred to conduct reception wave dynamic focusing in the same way as in Embodiment 1. These beamforming results are converted to the absolute values by an envelop converting circuit 92 and written as separate scan line data of the tomograms into a scan converter 94.

Figure 7:
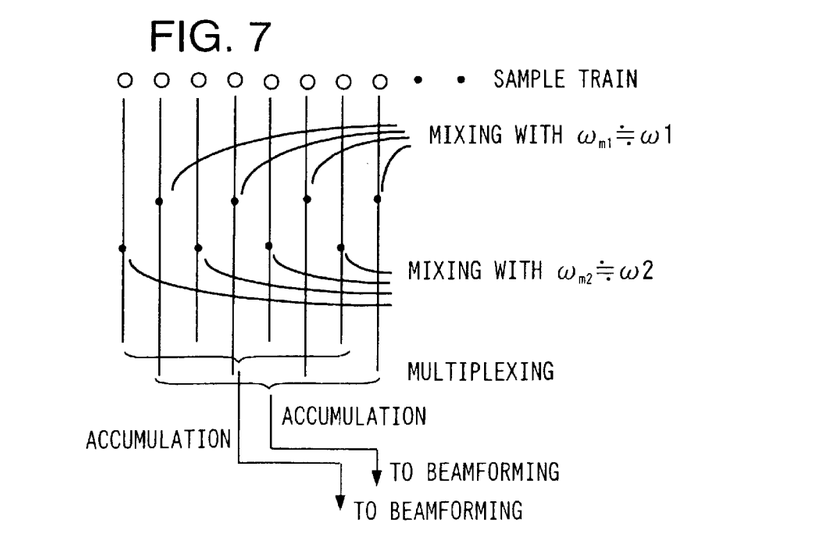
FIG. 7 is a conceptual view showing a processing of a sample train and an assorting operation.

FIG. 7 shows the mode of assortment of the reception signal samples obtained sequentially and beamformed in multiplicity, for ease of understanding. Incidentally, FIG. 4 shows the device construction comprising the multiplexer 112 and the double accumulating means 104-*a* and 104-*b*, but means in the next stage to the mixing means 103 may be processing means that have the functions of alternately assorting the mixing results and adding them. Such assorting and multiplex phasing can be realized because sampling is made beyond the Nyquist frequency of the reception signal in the stage of the digital converting means 102 and as a result the output of the mixing means 103 is obtained in a cycle far smaller than the required sampling cycle.

The operation described above gives two scan lines in parallel, that is constructed by two ultrasonic beams having different frequencies, with one wave transmission operation. In consequence, high-speed imaging can be made. When compared with the conventional system that simultaneously generates only a plurality of reception beams, this embodiment is superior in the aspect of lateral resolution because the transmission wave beams, too, have the independent focuses, respectively.

Various modifications can be made by applying the simultaneous transmission by two frequencies ω1 and ω2 in this Embodiment 2. One of such modifications is the removal of speckles. The term "speckle" means the interference pattern of the ultrasonic signals inside the living tissue. In practical diagnosis, there is an undesirable case in which a strong speckle is observed at portions where reflecting bodies do not actually exist. Since the speckle is the interference pattern, the appearing positions of the speckle vary when the frequency of the transmission wave signal varies. On the other hand, the signal from the actual reflecting body appears at the same position even when the frequency of the transmission signal varies. In other words, when the reflecting signals from the same position by the two transmission signals having mutually different frequencies are summed, the signals from the actual reflecting body strengthen each other while the speckle signals weaken each other. As a result, the speckles on the image can be decreased as is known in the art.

It will be assumed hereby that in the ultrasonic diagnosis device shown in FIG. 4, the focus F1 realized by the wave transmission focusing circuit 86 and the focus F2 realized by the wave transmission focusing circuit 86 exist at the same position. The mixing means 103 executes multiplication by using alternately the reference signal obtained from the signal having the frequency near ω1 and the reference signal obtained from the signal having the frequency near ω2. The double receive focusing means 105-*a* and 105-*b* execute the same beamforming process so that the phase is in alignment with the ultrasonic wave from the direction of the focus at the same position. These two beamforming results are summed and are then converted to the absolute values by the envelop converting circuit 92 to give the image data. In consequence, the two ultrasonic beams having the frequencies ω1 and ω2 formed simultaneously from one reception signal are added, and the speckles can be reduced in real time. Strictly speaking, however, it is not the data at the same timing that are added to each other, but the data deviated from each other by one sampling cycle T. Nonetheless, no problem develops at all as to the removal of the speckles.

Figure 8:
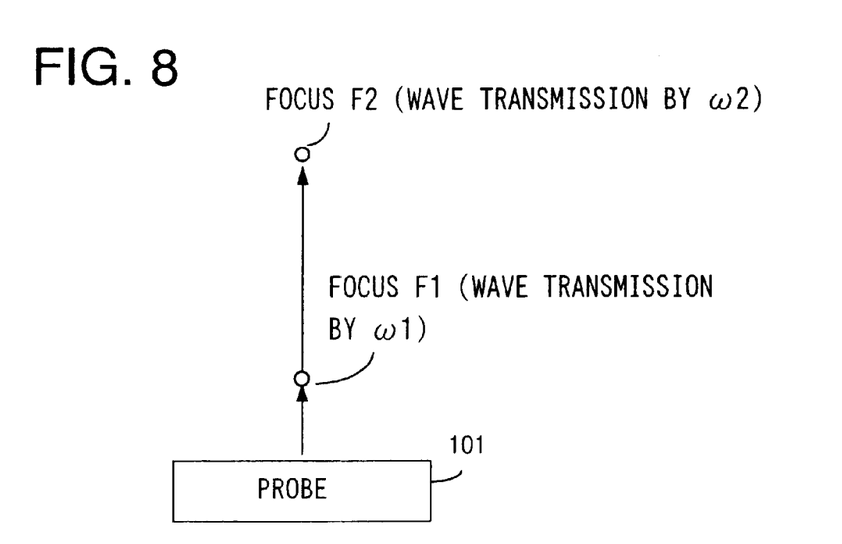
FIG. 8 is a conceptual view showing simultaneous transmission of a plurality of beams having different focal lengths in Embodiment 2 described above.

Next, an example of the application of Embodiment 2 to simultaneous multi transmit focusing will be explained. In this case, the focus F 1 and the focus F2 realized by the two wave transmission focusing circuits 86 and 87 shown in FIG. 4 have the same direction as shown in FIG. 8. However, the focus F1 takes a near distance with the focus F2 taking a far distance. If the center frequency ω1 of the first beam is 3.5 MHz, for example, the center frequency ω2 of the second transmit beam that are synthesized and transmitted with the first beam is set to about 2.7 MHz, so as to cope with the spectral shift of the far distance echo. The construction and operation of each means subsequent to the mixing means, and the digitized reference signals employed, are exactly the same as those of Embodiment 1 explained with reference to FIG. 1 to FIG. 3. The frequency of the digitized reference signal is decreased gradually with the lapse of time from wave transmission so as to cope with the spectrum shift of the reflection echo. In the case of the wave transmission frequency described above, the frequency of the reference signal is varied from 3.5 MHz toward 2.5 MHz, for example.

Under such wave transmission and reception signal processing, in the processing of a reception signal from a shallow depth, since the frequency of the reference signal used is approximate to ω1, a reflection response strongly reflecting the transmit beam of ω1 that converges in the near distance is obtained. On the contrary, in the processing of a reception signal from a deeper depth, a reflection response strongly reflecting the transmit beams of ω2 that converges in the far distance is obtained because the reference signal used is approximate to ω2. In other words, the resulting ultrasonic tomogram has high resolution in the lateral direction over a broad depth range. Moreover, because the ultrasonic beams having different converging distances are synthesized and transmitted simultaneously, the scan time does not increase and high-speed imaging can be conducted.

The invention completed by the present inventor has thus been explained concretely on the basis of the embodiments thereof. However, the present invention is not particularly limited to these embodiments but can be naturally modified in various ways without departing from the scope thereof.

INDUSTRIAL APPLICABILITY

The effects brought forth by the typical inventions disclosed in this application are briefly as follows.

(1) The frequency of the reference signal can be freely controlled in the digital ultrasonic diagnosis device in accordance with the frequency shift beamforming method, and various high-quality or high-speed imaging can be made in consequence.

(2) Harmonic imaging can be done.

(3) High-speed imaging can be done as a plurality of beams having mutually different frequencies are formed simultaneously.

(4) Resolution in the leteral direction can be improved in a broad depth range, and quality of the ultrasonic images can be improved.

What is claimed is:

1. An ultrasonic diagnosis device comprising:

wave transmitting means for driving an element group disposed in an array, for synthesizing first and second transmission wave signals having mutually different frequencies $\omega 1$ and $\omega 2$ as center frequencies thereof;

digital converting means for sampling signals obtained by detecting reflection echoes in said ultrasonic element group at a sampling frequency higher than a Nyquist frequency of an upper limit of a signal band and converting them to digital signals, respectively;

mixing means for multiplying said digital signals by first reference signal having a frequency near said $\omega 1$ and a second reference signal having a frequency near said $\omega 2$ by alternately switching them;

a multiplexer for assorting alternately multiplication results of said mixing means;

accumulating means for mutually and independently accumulating mutually multiplication results assorted in a direction of lapse of time and obtaining first and second accumulation results; and multiplexed wave reception focusing means for imparting a delay distribution for aligning a phase difference peculiar to each of said ultrasonic elements to each of said first and second accumulation results, respectively, and beamforming and adding said accumulation results.

2. An ultrasonic diagnosis device according to claim 1, wherein said first transmission wave signal and said second transmission wave signal generate transmit ultrasonic beams in first and second directions, respectively, and said multiplexed wave reception focusing means executes delaying and addition for imparting a delay distribution for compensating for a propagation time of an ultrasonic wave from said first direction for said first accumulation result and delaying and addition for imparting a delay distribution for compensating for a propagation time of an ultrasonic wave from said second direction for said second accumulation result.

3. An ultrasonic diagnosis device according to claim 1, wherein said first and second transmission wave signals generate transmit ultrasonic beams mutually travelling towards a focus existing at a same position, and said multiplexed wave reception focusing means executes delaying and addition for imparting a delay distribution for compensating for a propagation time of an ultrasonic wave from a direction of said focus for each of said first and second accumulation results.

4. An ultrasonic diagnosis device comprising:

wave transmitting means for synthesizing a first transmission wave signal for forming an ultrasonic beam having a center frequency $\omega 1$ and travelling towards a first focus in a near distance and a second transmission wave signal for forming an ultrasonic beam having a center frequency $\omega 2$ lower than said $\omega 1$ and travelling towards a second focus in the same direction as said first focus but in a far distance, and driving an ultrasonic element group disposed in an array, respectively;

digital converting means for sampling reception signals obtained by detecting reflection echoes in said ultrasonic element group at a sampling frequency higher than a Nyquist frequency of an upper limit of a signal band, and converting said reception signals to digital signals, respectively;

mixing means for multiplying said digital signals by reference signal having a frequency decreasing gradually from near said $\omega 1$ to near said $\omega 2$, respectively;

accumulating means for accumulating the digital signals multiplied, a number of said digital signals accumulated being equal to a number of a plurality of samples; and wave reception focusing means for imparting a delay for aligning a phase difference peculiar to each of said ultrasonic elements to said digital signals accumulated, and adding said digital signals delayed.

* * * * *